US006865728B1

United States Patent
Branson et al.

(10) Patent No.: US 6,865,728 B1
(45) Date of Patent: Mar. 8, 2005

(54) OBJECT ORIENTED FRAMEWORK MECHANISM FOR DISCOVERY OF COMPUTER SYSTEMS IN A NETWORK

(75) Inventors: Michael J. Branson, Rochester, MN (US); Jason E. Tedor, North Pole, AK (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/311,025

(22) Filed: May 13, 1999

(51) Int. Cl.[7] ............................................. G06F 19/00
(52) U.S. Cl. ...................... 717/108; 717/100; 707/101; 707/103
(58) Field of Search ........................ 717/1, 2, 11, 100, 717/108; 707/101, 103

(56) References Cited

U.S. PATENT DOCUMENTS

| | | | | | |
|---|---|---|---|---|---|
| 5,893,106 A | * | 4/1999 | Brobst et al. | ................ | 707/102 |
| 5,937,189 A | * | 8/1999 | Branson et al. | ............. | 395/701 |
| 5,987,423 A | * | 11/1999 | Arnold et al. | ................ | 705/14 |
| 5,999,940 A | * | 12/1999 | Ranger | ................... | 707/103 R |
| 6,014,637 A | * | 1/2000 | Fell et al. | ....................... | 705/26 |
| 6,049,665 A | * | 4/2000 | Branson et al. | ............. | 395/702 |
| 6,052,670 A | * | 4/2000 | Johnson | ........................ | 705/27 |
| 6,104,874 A | * | 8/2000 | Branson et al. | ............. | 395/702 |
| 6,195,791 B1 | * | 2/2001 | Carlson et al. | ................ | 717/1 |
| 6,199,197 B1 | * | 3/2001 | Engstrom et al. | ............... | 717/2 |
| 6,226,788 B1 | * | 5/2001 | Schoening et al. | ............ | 717/6 |
| 6,275,979 B1 | * | 8/2001 | Graser et al. | ................... | 717/2 |
| 6,286,047 B1 | * | 9/2001 | Ramanathan et al. | ........ | 345/733 |

* cited by examiner

Primary Examiner—Krisna Lim
(74) Attorney, Agent, or Firm—Schmeiser Olsen & Watts

(57) ABSTRACT

An extensible Object-Oriented (OO) framework mechanism in an object-oriented programming system defines objects and classes used to discover and, if desired, validate computer systems in a network. The OO framework mechanism defines a discover configuration object and one or more discovery agent objects that cooperate to discover computer systems in the network. If desired, the OO framework mechanism may also define one or more candidate validator objects that validate the discovered computer systems for use with a particular application or program.

42 Claims, 3 Drawing Sheets

OBJECT ORIENTED FRAMEWORK MECHANISM FOR DISCOVERY OF COMPUTER SYSTEMS IN A NETWORK

BACKGROUND OF THE INVENTION

1. Field of the Invention

The present invention relates, in general, to computers connected through one or more networks. More specifically, the present invention relates to discovery of computer systems in a network by using an object-oriented framework.

2. Background of the Invention

Computers have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time, computer networks began being developed to allow computers to work together.

Computer networks are capable of performing jobs that no single computer could perform, and they allow low cost personal computer systems to connect to larger systems to perform tasks that such low cost systems could not perform alone. In order for computer systems to cooperate in a network, there are times when it is beneficial to find particular computer systems in the network.

For instance, a systems administrator might wish to manage all of the File Transfer Protocol (FTP) servers in a network. For example, he or she may wish to add files to the servers. In order for the system administrator to add files to these servers, it would be beneficial to know how many FTP servers there are in the network and how to contact these servers. Similarly, if a person would like to send an update to all computers in the network that are running a particular operating system, this person would like to find computers in the network that have this operating system. Additionally, perhaps the update is written for a certain version of a program that runs on this operating system. In this case, the person would additionally like to find only those computers that have the operating system, the program, and this exact version of the program.

In some network tools, it is possible for the system administrator or another person to create and define a computer system in the tool. This effectively allows the tool, and the computer on which the tool resides, to contact and manage the newly added computer system. While this can be a benefit for small networks, this can be quite problematic for large or very large networks. Some networks can consist of thousands of computers, and it is very hard for system administrators to create and define all of these computers. This is particularly true, for example, because minor changes to a computer system may make the previously defined computer system hard to locate. For instance, if the system administrator calls a computer system "West_Coast—101" and the person using this computer system changes the computer's networking name to "Frank's Computer," any tool or program looking for "West_Coast—101" will not find "Frank's Computer."

Because of the problems inherent in managing or using large networks, some system administrators and programmers have used custom-made programs that discover computer systems in a network. These programs can search on the network for certain types of computers. Generally this search is performed by using a communications protocol to attempt to locate computers that use this protocol. For instance, a program written to use the popular Internet Protocol (IP) might broadcast a message on the network that asks for a response. Those computers that respond to the request are then cataloged by the program. Alternatively, because the range of IP addresses in a network is known, the program could send a message to each IP address in the network. Through certain techniques, the program could determine whether there is a computer at one or more of these addresses. Additionally, it is possible to combine both techniques to provide a very good discovery system.

Once the computers in the network are cataloged, the program will usually then make an additional determination. The application that will be using the computer systems in the network may only want computer systems that have a particular operating system or version thereof, or a particular piece of software or a version thereof. The program must make the additional determination of whether each computer meets the criteria set by the application. This determination process is called "validation." If the computer is valid, the program adds the computer to a final list of valid computers. This list is then given to the application for use by the application. For certain networks, where merely finding a system ensures that it is valid for use by an application, validation need not be performed.

Thus, one solution to managing and using large networks is automatic discovery (and validation, if needed) of computer systems. Automated discovery is also used in small networks, as it makes the system administrator's job easier.

Because these programs that perform discovery and validation are written for particular communications protocols and application criteria, additional programs need to be rewritten every time a new communication protocol or new application criteria are developed. Additionally, changes to communications protocols or application criteria necessitate incremental changes in the programs. With the current pace of technology, operating systems and communications protocols that are even a few years old have usually been changed multiple times and may be obsolete.

While automatic discovery and validation programs can find and validate computers in a network, they must be rewritten frequently to keep up with the changes in technology. Without a mechanism that can be readily customized and extended to provide for discovery and validation of computers in a network, programmers will be constantly making wholesale changes to or creating new programs to discover and validate systems in a network.

SUMMARY OF THE INVENTION

According to the present invention, an extensible Object-Oriented (OO) framework mechanism in an object-oriented programming system defines objects and classes used to discover and, if desired, validate computer systems in a network. The OO framework mechanism defines a discover configuration object and one or more discovery agent objects that cooperate to discover computer systems in the network. If desired, the OO framework mechanism may also define one or more candidate validator objects that validate the discovered computer systems for use with a particular application or program.

The framework mechanism includes core classes whose inner programming cannot be changed and classes for which it is anticipated extension of the classes with new attributes and methods will occur. A program developer can customize the extension classes to meet the needs of any application that needs to discover and validate computer systems in the network.

Other features and advantages of the present invention should be apparent from the following description of the preferred embodiments, which illustrate, by way of example, the principles of the invention.

DESCRIPTION OF THE PREFERRED EMBODIMENTS

Overview—Object-oriented Technology

Figure 1:
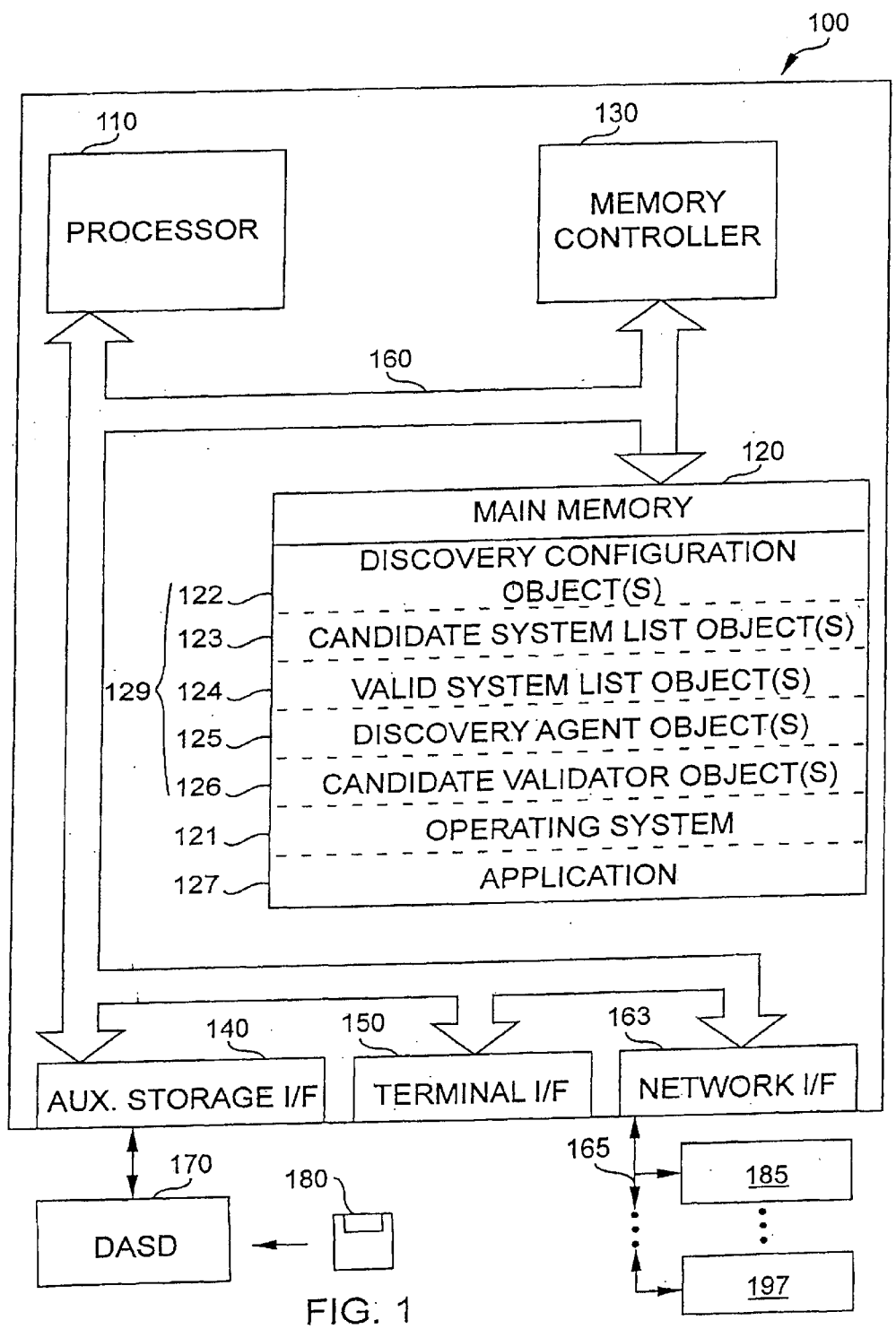
FIG. 1 is a block diagram of a computer system used in a preferred embodiment of the present invention.

The present invention was developed using Object-Oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework that is not subject to modification by the framework purchaser. The extensible function, on the other hand, is that part of the framework that has been explicitly designed to be customized and extended by the framework purchaser. In the present invention, the core functions are abstract classes that the user cannot change.

Additionally, there are also abstract functions that are extensible, meaning that the user can create classes that inherit from the core functions. The new classes can then be modified by the user.

OO Frameworks

While in general terms an OO framework can be properly characterized as an OO solution, there is nevertheless a fundamental difference between a framework and a basic OO solution. The difference is that frameworks are designed in a way that permits and promotes customization and extension of certain aspects of the solution. In other words, frameworks amount to more than just a solution to the problem. The mechanisms provide a living solution that can be customized and extended to address individualized requirements that change over time. Of course, the customization/extension quality of frameworks is extremely valuable to framework consumers because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization by the framework consumer) and the extensible function of the framework (i.e., that part of the framework that is to be subject to potential customization). In the end, the ultimate worth of a framework rests not only on the quality of the object design, but also on the design choices involving which aspects of the framework represent core functions and which aspects represent extensible functions.

DETAILED DESCRIPTION

The present invention provides an object-oriented (OO) framework mechanism for discovery of computer systems in a network. The OO framework mechanism preferably comprises four classes. A framework customizer, who changes the framework to fit his or her own network and applications (this person will be called a "user" or "customer" herein), extends part of the framework through extensible classes. Two of the four classes in the framework mechanism are core classes (in that a user cannot change the classes), one of which is also extensible (in that a user can create subtype classes that inherit from the core class and make modifications to the subtype classes). Two additional classes of the framework are also extensible, yielding a total of three extensible classes. For these two classes, they have a core existence (the framework mechanism defines them) but do not have implementation for certain of their methods. The user of the OO framework mechanism should know the characteristics of the kinds of systems that should be automatically discovered and defined in order to work with a particular application or product. Because the user knows (or can determine) the system types, operating systems, products, or versions of these, with which a particular application can work, the user will know what systems can be discovered and how to validate those systems.

The user then creates classes (called subtype classes) that inherit from the extensible classes of the OO framework mechanism of the present invention. He or she adds the actual method implementations used to discover and validate (if desired) systems in the network. Objects instantiated from the subtype classes contain all of the methods, data elements, data structures, etc., of the extensible classes. An application will call certain methods defined by the OO framework mechanism that will then run multiple user-extended discovery methods and validation methods.

Because there are defined, extensible classes in the OO framework mechanism, it is easier to determine where to add and to add particular changes to these classes to achieve discovery and validation. In addition, because the framework mechanism has core and extendible classes, there is already a structure defined that the user does not need to define—the user simply creates additions to the structure to meet his or her requirements. This is a benefit because the application does not need to change if changes to discovery or validation mechanisms are made. Because the application only sees an interface to the framework mechanism, and the interface is defined by the framework mechanism and should not change, any changes to discovery and validation inside the framework are completely hidden from the application.

Turning now to FIG. 1, this figure shows a block diagram of a computer system 100 in accordance with the present invention. The computer system of the preferred embodiment is a computer system such as an AS/400 platform. However, those skilled in the art will appreciate that the mechanisms and apparatus of the present invention apply equally to any computer system, regardless of whether the computer system is a complicated multi-user computing apparatus or a single user workstation. As shown in the exploded view of FIG. 1, computer system 100 comprises a processor 110 connected to main memory 120, a memory controller 130, a terminal interface 150, an auxiliary storage interface 140, and a network interface 163. These system components are interconnected through the use of a system bus 160. Auxiliary storage interface 140 is used to connect mass storage devices (such as a Direct Access Storage Device, or DASD, device 170) to computer system 100. One specific type of DASD device is a floppy disk drive, which may store data to and read data from a floppy diskette 180. Network interface 163 communicates through network 165 with multiple computer systems, such as computer systems 185 and 197 that are shown in this example.

Main memory 120 contains an OO framework mechanism 129, an operating system 121, and an application 127. OO framework mechanism 129 preferably comprises one or more of each of the following: a discovery configuration object 122, a candidate system list object 123, a valid system list object 124, a discovery agent object 125, and a candidate validator object 126. These will be discussed in more detail below. Computer system 100 utilizes well known virtual addressing mechanisms that allow the programs of computer system 100 to behave as if they only have access to a large, single storage entity (referred to herein as "memory") instead of access to multiple, smaller storage entities such as main memory 120 and DASD device 170. Therefore, while application programs 127, OO framework mechanism 129, and operating system 121 are shown to reside in main memory 120, those skilled in the art will recognize that these programs are not necessarily all completely contained in main memory 120 at the same time. Note that the term "memory" is used herein to generically refer to the entire virtual memory of computer system 100.

Operating system 128 is preferably a suitable multitasking operating system such as OS/400; however, those skilled in the art will appreciate that the spirit and scope of the present invention is not limited to any one operating system. Operating system 121 supports an object oriented programming environment such as that provided, for example, by the C++ programming language. One or more application programs 127 provide a programming environment for computer system 100. In general, application 127 will comprise framework mechanism 129. Framework mechanism 129 may be used in multiple applications at the same time. Framework mechanism 129 contains instructions capable of being executed on CPU 110 and may exist anywhere in the virtual memory space of computer 100.

Although computer system 100 is shown to contain only a single main CPU and a single system bus, those skilled in the art will appreciate that the present invention may be practiced using a computer system that has multiple CPUs and/or multiple buses, whether contained in a single unit or distributed across a distributed processing computer system.

Terminal interface 150 is used to directly connect one or more terminals (not shown in FIG. 1) to computer system 100. These terminals, which may be non-intelligent or fully programmable workstations, are used to allow system administrators and users to communicate with computer system 100.

Network interface 163 is used to connect other computer systems and/or workstations (e.g., 185 and 197 in FIG. 1) to computer system 100 in networked fashion. The present invention is used to discover computer systems on network 165 and, if desired, to validate the discovered systems for use with an application. The present invention applies equally no matter how computer system 100 may be connected to other computer systems and/or workstations, regardless of whether the connection to the network is made using present-day analog and/or digital techniques or via some networking mechanism of the future. It is also important to point out that the presence of network interface 163 within computer system 100 means that computer system 810 may engage in cooperative processing with one or more other computer systems or workstations. Of course, this in turn means that the programs shown in main memory 120 need not necessarily all reside on computer system 100. For example, one or more application programs 127 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disk (e.g., 180 of FIG. 1) and compact disks, and transmission type media such as digital and analog communication links. When the framework mechanism of the current invention is placed on signal bearing media, the framework provides the objects, classes, and other information that are then executed by an object-oriented environment to discover and validate computer systems in a network.

As stated previously, system discovery framework mechanism 129 preferably comprises one or more of each of the following: a discovery configuration object 122, a candidate system list object 123, a valid system list object 124, a discovery agent object 125, and a candidate validator object 126. There will usually be a number of discovery agent objects 125, and these objects discover computer systems on the network. The discovery agent objects 125 discover systems in the network, generally by communicating with systems through particular communications protocols. In addition, messages or requests could be sent to a particular application or program on systems in the network to discover computer systems. While some communication protocol is being used in this technique, this is really a request that only a particular application or program might understand. Applications that respond to the request would have the systems on which they reside added to a candidate systems list. It should be noted that a discovery agent might perform discovery but not actually discover computer systems in the network, even when there are computer systems in the network that are discoverable by this particular discovery agent. A discovery configuration object 122 adds the discovery agent objects 125 to a discovery agent list (not shown in FIG. 1). The discovery configuration object 122 then invokes each discovery agent object. Each discovery agent object returns a list of candidate objects (not shown in FIG. 1). The discovery configuration object 122 distills these multiple lists, as a union, into candidate system list object 123.

If validation is being performed, discovery configuration object 122 will add the one or more candidate validator objects 126 to a candidate validator list (not shown in FIG. 1) and subsequently invoke the candidate validators 126 in the list. Each candidate validator checks one particular candidate system from candidate system list object 123. If the candidate validator 123 validates the candidate system, the discovery configuration object 122 adds the candidate system to the valid system list object 124 as a valid system. Subsequent candidate validator objects 123 are not run if a previous candidate validator object validates a candidate system.

The system discovery framework mechanism 129 disclosed herein provides an architecture for discovering and validation computer systems in a network. By providing framework mechanism 129 within computer system 100 to define a mechanism that discovers and validates computer systems, a uniform interface for all discovery and validating systems may be developed. Framework mechanism 129 may replace all of the proprietary and incompatible discovery and validating systems that are currently in use. This would allow a common programmer interface for defining virtually any type of discovery system. The common programmer interface greatly eases the burden of programming and maintaining an discovery and validating system. Thus, some of the primary benefits of the framework mechanism disclosed herein is the capability to define new discovery and validating systems with similar user interfaces using a simple, easy-to-use programmer interface defined by the framework mechanism.

That the preferred embodiment of the framework mechanism is object-oriented allows the framework consumer to easily define the needed functions by subclassing from the classes defined within the framework mechanism using known object oriented programming environments, such as C++. The preferred embodiment of the present invention is an object oriented framework mechanism for discovery (and validation, if desired) of computer systems in a network. While many different designs and implementations are possible, one suitable example of an object-oriented system discovery framework mechanism is disclosed below to illustrate the broad concepts of the present invention.

Figure 2:
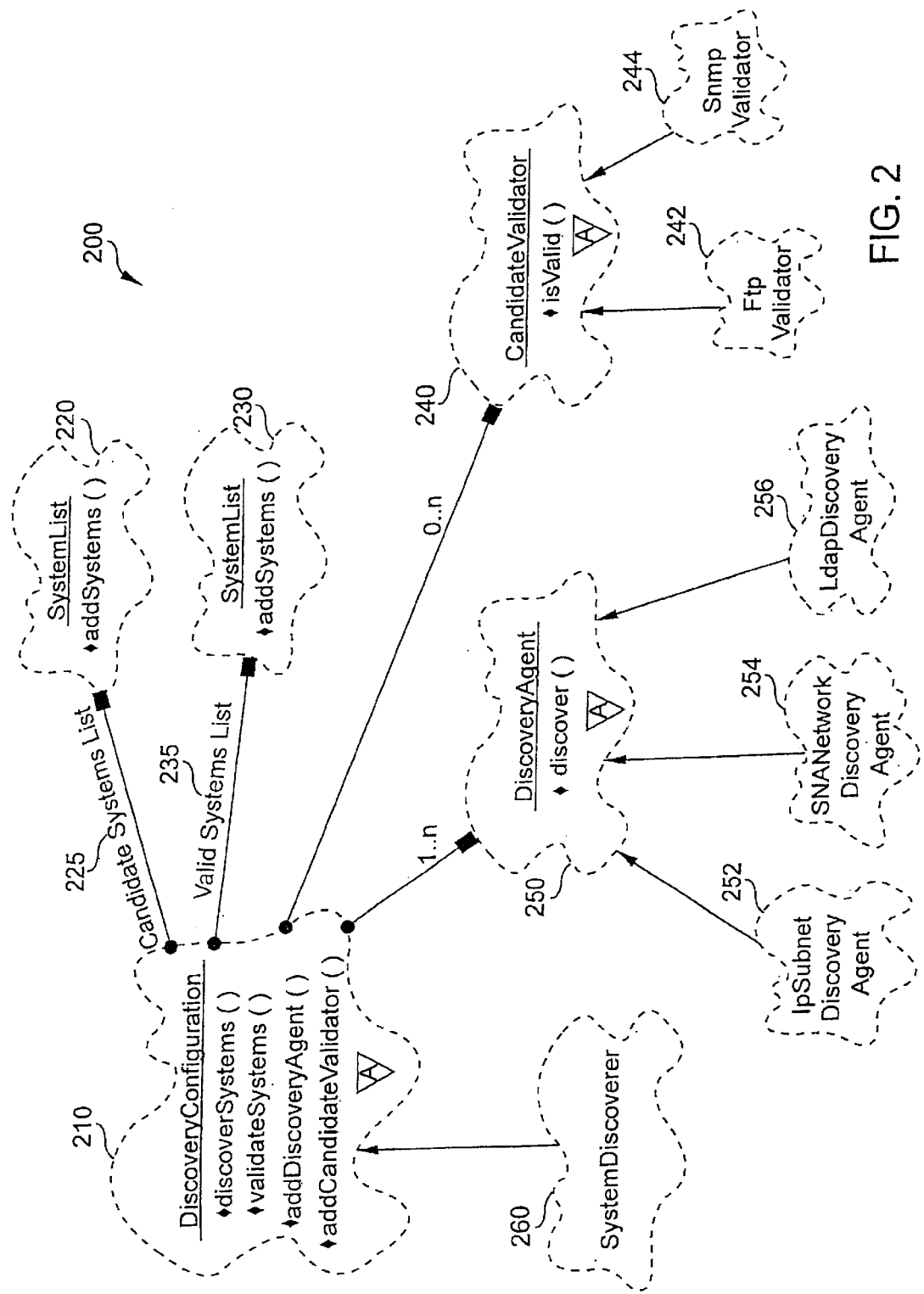
FIG. 2 is a class diagram for a preferred object-oriented framework.
Figure 3:
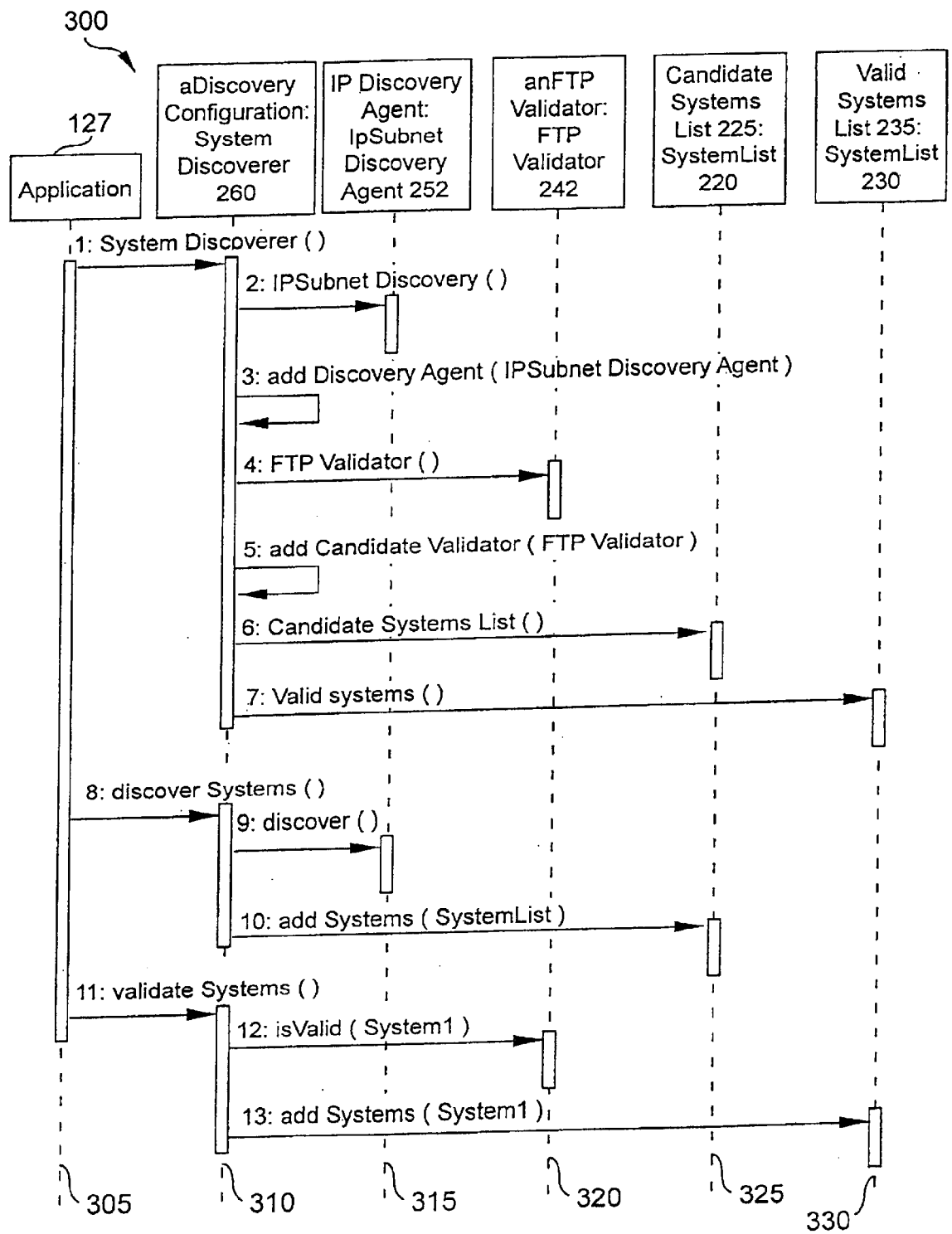
FIG. 3 is an object interaction diagram for a preferred object-oriented framework.

In FIGS. 2 and 3, the interaction of the various classes and objects instantiated from those classes is shown. FIG. 2 shows the framework mechanism of the current invention from more of a structural standpoint, while FIG. 3 shows the framework mechanism from more of a flow standpoint. While some flow and interaction between the classes will be discussed in reference to FIG. 2, most of the discussion of flow will be delayed until FIG. 3.

Referring now to FIG. 2, this figure is an example class diagram of the object-oriented systems discovery framework mechanism 200. Note that, while the important methods are shown in the class diagram, many methods are not shown. For example, none of the constructor methods are shown. In addition, most objects are not shown. Those skilled in the art will, however, know that objects may be instantiated from some of the classes in FIG. 2. The objects of FIG. 2 will be instantiated at the appropriate time by the appropriate methods. Furthermore, the names given to the classes and objects instantiated from the classes are arbitrary. These names, however, do help in describing the function of each class. With this in mind, the structure and some function of the framework mechanism will now be described with reference to the specific classes and methods referenced in FIG. 2.

A framework consumer will have to define a SystemDiscoverer class 260 and instantiate a SystemDiscoverer object as a member of that class. The SystemDiscoverer class 260 inherits from DiscoveryConfiguration class 210, which is preferably abstract (as indicated by the "A" in the upside-down triangle). DiscoveryConfiguration class 210 comprises the following methods: discoverSystems, validateSystems, addDiscoveryAgent, and addCandidateValidator. These methods and more about the SystemDiscoverer class will be discussed in more detail in FIG. 3. DiscoveryConfiguration class 210 is a core class but is also extensible. This is a core class because the class cannot be changed, although it can be extended. DiscoveryConfiguration class 210 preferably is in a "has" relationship (a "reference by value" relationship) with SystemList classes 220 and 230, DiscoveryAgent class 250, and CandidateValidator class 240. DiscoveryAgent class 250 and CandidateValidator class 240 are preferably abstract classes (as indicated by the "A" in the upside-down triangle). These classes are extensible classes that the user of the framework mechanism is expected to change. In addition, the framework mechanism defines the existence of these classes but not the implementation of some of their methods. Thus, these classes are core classes in terms of their existence (which cannot be changed by a framework consumer), but not in their implementation (which can be changed by a framework consumer). There are some example DiscoveryAgent classes that are shown in FIG. 2 as IpSubnet Discovery Agent class 252, SNANetwork Discovery Agent class 254, and Ldap Discovery Agent class 256. Additionally, there are several example CandidateValidator classes shown in FIG. 2 as Ftp Validator class 242 and Snmp Validator class 244.

For every DiscoveryConfiguration object (an object that is instantiated from a class that inherits from DiscoveryConfiguration class 210), there will one or more Discovery Agent objects (objects that are instantiated from classes that inherit from DiscoveryAgent class 250). This is indicated by the "1 . . . n" relationship indicated in FIG. 2 between DiscoveryConfiguration 210 and DiscoveryAgent 250. Similarly, for every DiscoveryConfiguration object (an object that is instantiated from a class that inherits from DiscoveryConfiguration class 210), there will one or more candidate validator objects (objects that are instantiated from classes that inherit from CandidateValidator class 240). This is indicated by the "0 . . . n" relationship indicated in FIG. 2 between DiscoveryConfiguration 210 and CandidateValidator 240. The "zero" in this relationship occurs because, in a trivial case, all of the candidate computers will be automatically validated. For instance, in a small network or a small subnet (in internet protocol terms) of a large network, there may only be computers running a certain operating system and programs at a certain revision level. This operating system and these programs may be already valid for the application that will be using these systems (note that an application's interaction with systems discovery framework mechanism 200 is described in reference to FIG. 3). No validation might be required. A consumer of the current invention would know that all discovered systems are valid and would choose not to create a subclass that implements the isValid ( ) method of CandidateValidator class 240. In general, however, there will be multiple validators.

Preferably, SystemList classes 220 and 230 are the same class. However, they are separated in FIG. 2 to indicate that there will be preferably two objects that should be instantiated from this class. Additionally, these classes are also separated because, if desired, the two classes may be separate. However, because the SystemList classes basically perform the same function (adding objects to a list), they are preferably the same class and are separated for clarity. The objects instantiated from these classes are denoted in FIG. 2 as CandidateSystems object 225 and ValidSystems object 235. The CandidateSystems object 225, after being instantiated from SystemList class 220, will be used to hold candidate systems found by discovery agent objects (which are instantiated from DiscoveryAgent classes 252, 254, and 256). The ValidSystems list object 235, after being instantiated from SystemList class 230, will be used to hold valid systems that have been validated by candidate validator objects (which are instantiated from CandidateValidator classes 242 and 244).

SystemList classes may be any class used to hold an array or list of objects (systems). These classes are preferably core classes that should not be modified by a framework consumer. If desired, however, these classes may be extensible to allow a consumer to add additional functionality to the classes. Systems objects, which are added to the array or list, should have data members such as an operating system and version or release of the same, a program and version or release of the same, booleans for certain communications protocols, addresses for certain communications protocols, etc. The SystemList class could be a single class or a hierarchy of classes based on an abstract class. A hierarchy of classes is preferred if it is desired to add extendible features to the SystemList class. Those skilled in the art may adopt the SystemList class or class hierarchy to best suit their particular communications protocols, networks, applications, and programming environment.

The three DiscoveryAgent classes, classes 252, 254, and 256, preferably inherit from DiscoveryAgent class 250. Thus, these classes are preferably subclasses of DiscoveryAgent class 250. Because each of these classes inherit from DiscoveryAgent class 250, they have the methods and data elements that DiscoveryAgent class 250 has. Thus, each DiscoveryAgent class, classes 252, 254, and 256, will have the discover ( ) method. The consumer of the framework mechanism is to place the mechanisms that discover computers in the network in the discover ( ) method of each discovery agent. The systems discovery framework 200 thus provides a DiscoveryAgent class 250 whose existence is core and should not be changed by the consumer, but whose discover ( ) method is extensible and is to be changed by the consumer.

Computer system discovery mechanisms will generally use particular communications protocols to try and communicate with computers on the network through these protocols. Furthermore, other mechanisms such as communicating with distributed directories (e.g., using LDAP or similar mechanisms) to determine computer systems may be used in addition to or as a replacement for communication protocol discovery mechanisms. As in known in the art, there are multiple approaches to discovering computers in a network, even when using the same protocol. For instance, a consumer creating the IpSubnet ("Ip" stands for "Internet protocol") Discovery Agent class 252 and implementing the discover ( ) method for this class might send an "Is anybody on this subnet" message during execution of the discover ( ) method. The computers on the subnet (an address that corresponds to a region of the network) should answer this query. Alternatively, the consumer could create a discover ( ) method that iterates through every address in the subnet. The discover ( ) method, through techniques known to those skilled in the art, could determine if systems existed at individual addresses.

The techniques used to find computers in the network will differ with differing communications protocols and other mechanisms for discovering computer systems. For instance, the techniques used to find computers using internet protocols will generally not be the same as the techniques used to find computers using the Systems Network Architecture (SNA) protocols (defined by the discover ( ) method of SNA Network DiscoveryAgent class 254). While techniques used to find computer systems in the network with SNA would be similar to those used by IP discovery agents, SNA discovery agents would invoke SNA using different interfaces and formats. Similarly, the techniques used to find computers using SNA protocols will not be the same as the techniques used to find computer s using the Light-weight Directory Access Protocols (defined by the discover ( ) method of LDAP Discovery Agent class 256). While SNA is a communications protocol, LDAP is a distributed directory that usually stores system information in it. A technique used to discover systems using LDAP could be querying the distributed directory about computer systems. Additionally, other mechanisms may be used to find computer systems in the network, such as directly querying particular programs on systems. Those skilled in the art can add classes that extend the abstract DiscoveryAgent class 250 for their particular communications protocols or other mechanisms used to discover computer systems in the network. Thus, the DiscoveryAgent class 250 is a powerful part of systems discovery framework mechanism 200, as the discover ( ) method of this class can be implemented or modified to suit new or changed, respectively, communications protocols or other discovery mechanisms.

In certain instances, the same system may be found by more than one Discovery Agent object. For instance, some computers can support more than one communications protocol at the same time. Because of this, each DiscoveryAgent object hands a SystemList (not shown in FIG. 2) back to the discoverSystems ( ) method of DiscoveryConfiguration class 210. The discoverSystems ( ) method creates CandidateSystems list 225 that is the union of all returned candidate systems. This is described in more detail in reference to FIG. 3.

The two CandidateValidator classes, classes 242 and 244, preferably inherit from CandidateValidator class 240. Therefore, these classes are preferably subclasses of CandidateValidator class 240. Because each of these classes inherit from CandidateValidator class 240, they have the methods and data elements that CandidateValidator class 240 has. Thus, each CandidateValidator class, classes 242 and 244, will have the isValid ( ) method. The consumer of the framework mechanism is to place the mechanisms that validate computers for use with the current application in the isValid ( ) method of the candidate validator. The systems discovery framework 200 thus provides a CandidateValidator class 240 whose existence is core and should not be changed by the consumer, but whose isValid ( ) method is extensible and is to be changed by the consumer. Validation can involve determining a particular kind of system, operating system, or software, or particular versions of the last three items. In addition, combinations of the aforementioned may be used. For example, an application might be programmed to interact with AS/400 computers having OS/400 operating systems that are at least version four, release three. CandidateValidator objects, for their isValid ( ) methods, would then determine if any of the candidate systems (in CandidateSystems list 225) meet these criteria. The consumer of the current invention, thus, will implement the isValid ( ) method of the classes that inherit from CandidateValidator 240 to validate candidate computer systems as per the criteria dictated by the application.

In the example systems discovery framework mechanism 200 of FIG. 2, a consumer has created two classes that inherit from CandidateValidator class 240: FtpValidator class 242 and SnmpValidator classs 244. Objects instantiated from FtpValidator class 242 will use the File Transfer Protocol (the "Ftp" in "FtpValidator") to contact an FTP server on a candidate system in the CandidateSystems list 225. If there is no FTP server on a candidate system, then there will be no response. Additionally, if there is no response, that does not necessarily mean that there is no FTP server on the candidate system; it only means that there was no response. There could be an FTP server on the candidate system, and it did not respond in time (it was too busy, for instance). If there is a response, then the FtpValidator object (which is instantiated from FtpValidator class 242) could be programmed to validate the computer. For instance, if the application asking if the system is valid needs to know only that there is an FTP server at the candidate system, then the FtpValidator object will add the system to ValidSystems list 235. The application may have additional criteria for validation, such as a particular operating system and version and/or release of the operating system. If the FTP server can be queried as to this criteria, then the FtpValidator object can validate candidate computers as per this criteria.

In the example of FIG. 2, the consumer of the current invention has also created SnmpValidator class 244. This class, in the isValid ( ) method defined by the consumer, uses the Simple Network Management Protocol (SNMP) to determine various information about the computer systems in the candidate systems lists. If the FtpValidator object does not validate a particular system, the SnmpValidator object (instantiated from class 240) will then attempt to validate the system using criteria defined by the consumer and dictated by the application. If neither validator validates a candidate system, this candidate system is not added to the ValidSystem list 235. This will be discussed in more detail below. That neither validator validates a candidate system does not mean that the candidate system is not valid for use with an application; it simply means that the two validators could not validate the system.

Additionally, the consumer can make the isValid ( ) method look for more esoteric criteria (as determined by the application). For instance, the isValid ( ) method could test response time (e.g., of a web or FTP server) and validate only those systems that respond within a certain time frame. This could be important to direct requests for web sites or files, for instance, and the application could use systems discovery framework mechanism 200 to better direct requests to systems in the network that respond quicker.

Thus, the CandidateValidator class 240 (and the DiscoveryAgent class 250) provides a consumer with an extension point where the consumer can add to systems discovery framework mechanism 200 to adapt the framework mechanism for his or her own network and applications.

In general, DiscoveryAgents are network-dependent (and, in many instances, communication protocol dependent), whereas CandidateValidators are application and application criteria dependent. If the network changes or the network protocol changes, a new DiscoveryAgent subclass with a new discover ( ) method may be created. Alternatively, an already created DiscoveryAgent subclass could be modified, if possible, to deal with the new network or protocol change. Regardless of which method is chosen, the majority of the framework mechanism need not be replaced, which saves the consumer tremendous time and expense. If the application or application criteria changes, a new CandidateValidator subclass with a new isValid ( ) method may be created or an old is Valied ( ) method on an old CandidateValidator subclass may be modified to handle the new application or criteria.

While classes 210, 250, and 240 are shown as abstract classes, these classes may be implemented slightly differently, depending on the language. The classes shown are being described in more of a C++ object-oriented format. For other object-oriented formats, some modifications to the format may be made. For example, JAVA, which is a popular object-oriented language, supports the concept of "interfaces." Interfaces are essentially a way to describe the interface of a class without describing what goes in the interface. Thus, a method could be described in an interface without describing the internals of the method. Instead of inheriting from an interface, a consumer-developed class would "implement" an interface. Interfaces and abstraction may also be mixed. In the example of FIG. 2, the DiscoveryAgent 250 and CandidateValidator 240 classes could be interfaces, meaning that the discover ( ) and isValid ( ) methods are to be implemented by the consumer. Similarly, the DiscoveryConfiguration class 210 would be an abstract class, because the methods in the abstract class have internals that the consumer should not change. Interfaces are still extensible. Those skilled in the art may modify the current invention to accommodate the particular language being used.

Note that the extensible classes in systems discovery framework mechanism 200 define at least a portion of the classes (and objects instantiated therefrom) that inherit from the extensible classes. For instance, a discovery configuration object instantiated from SystemDiscoverer class 260 will have at least a portion of the discovery configuration object defined by DiscoveryConfiguration class 210. This portion corresponds to the interface and method implementations that are defined by DiscoveryConfiguration class 210. Similarly, DiscoveryAgent class 250 and CandidateValidator class 240 define a least a portion of the discovery agent objects and candidate validator objects, respectively. In the example of FIG. 2, this portion corresponds only to interface (the isValid and discover methods), as the implementation of the methods are extensible and are implemented by the framework consumer.

Turning now to FIG. 3, this figure shows an object interaction diagram 300 that describes a preferred sequence of method calls on objects to discover and validate systems in a network. Across the top of object interaction diagram 300 are the different objects in the diagram and classes from which these objects are instantiated. In this example, there are the following objects instantiated from the following classes: an application object 127, instantiated from an application class (not shown); a discovery configuration object, instantiated from SystemDiscoverer class 260; an IP discovery agent, instantiated from IPSubnetDiscoveryAgent class 252; an FTP validator object, instantiated from FTPValidator class 242; a candidate systems list object 225 instantiated from SystemList class 220; and a valid systems list object 235, instantiated from SystemList class 230 (which, as described above, is generally the same class as SystemList class 220). Note that, in FIG. 3, the convention that an "a" (for aDiscovery Configuration object) or an "an" (for aFTP Validator object) are added to the object names to distinguish an object from a class having the same name. Inheritance and other relationships are found in, and better described in reference to, FIG. 2. Object interaction diagram 300 has lines 305, 320, 315, 320, 325, and 300 that indicate which methods are called on which object in this particular scenario.

Concerning candidate systems list object 225 and valid systems list object 235, both of these objects are preferably instantiated from one class, the SystemList class. As described in reference to FIG. 2, SystemList class 220 and SystemList class 230 are preferably the same class. They are separated in FIGS. 2 and 3 for clarity, as there are preferably two lists based on this class—a candidate system list and a valid system list. These classes are also separated because these may be different classes, if desired. Further discussion of these lists will be delayed until methods are called, below, that concern these lists.

The object interaction begins in method one when an application 127 (an object instantiated from an application class, which is made by the consumer) calls the SystemDiscoverer constructor. The consumer of the current invention has three important roles to create in the current framework mechanism. The first role is to create the constructor for the class that inherits from DiscoveryConfiguration class 210. In this example, the class that inherits from DiscoveryConfiguration class 210 is SystemDiscoverer class 260. The consumer's role with this class is to implement the constructor for the SystemDiscoverer class 260, because the constructor is the preferred entity that registers the various discovery agents and candidate validators and creates the candidate systems and valid systems lists. While there may be other ways to perform the same functions, implementing the constructor is the easiest and simplest method of performing these functions. Naturally, other methods may be added to SystemDiscoverer class 260 other than the constructor, but the constructor is preferably the only change the consumer needs to make when inheriting from the DiscoveryConfiguration.

The consumer in this instance has called, in method two, the IPSubnet Discovery Agent class 252 constructor to instantiate an IP discovery agent. This discovery agent discovers systems by using the internet protocol. The consumer's second major role in extending the current invention for his or her own use is to create his or her own discovery agents by implementing the discover ( ) method of each discovery agent. As explained in reference to FIG. 2, discovery agents should be specific to consumer's network and, in many instances, to the communications protocol used by systems on the network. The consumer then calls, in method three, the addDiscoveryAgent ( ) method on the SystemDiscovery object that has been instantiated from the SystemDiscoverer class 260. The addDiscoveryAgent method accepts the discovery agent (IPSubnetDiscovery Agent) and adds this to a discovery agent list (not shown in FIG. 3). The discovery agent list is a list of discovery agent objects to run when discovery of computers is attempted in the network. This list can be any list known to those skilled in the art that allows objects to be selected and executed. Because this list and the addDiscoveryAgent ( ) method are part of the core of the framework mechanism, the consumer generally should not attempt to change these.

Although the example of FIG. 3 only lists one discovery agent, there will generally be multiple discovery agents for most networks. For instance, FIG. 2 lists the additional discovery agents of the SNANetwork and Ldap discovery agents. To add these discovery agents to the framework mechanism, the consumer would call the constructor for each discovery agent and then call addDiscoveryAgent ( ) with a reference to the recently added discovery agent. In this manner, any number of discovery agents may be added by the consumer to the discovery agent list.

The consumer then, in method 5, creates an FTP validator object by calling the constructor for the FTPValidator class 242. The consumer's third major role in extending the current invention for his or her own use is to create his or her own candidate validators by implementing the isValid ( ) method of each candidate validator. As explained in reference to FIG. 2, these validators should be specific to application 127 and, in particular, to the criteria set by application 127. After the validator object is instantiated, the consumer adds the validator object to the validator list by calling method 5, addCandidateValidator ( ). This method accepts the validator (FTPValidator) and adds this to the validator list (not shown in FIG. 3). The validator list is a list of discovery agent objects to run when discovery of computers is attempted in the network. This list can be any list known to those skilled in the art that allows objects to be selected and executed. Because this list and the addCandidateValidator ( ) method are part of the core of the framework mechanism, the consumer generally should not attempt to change these.

Although the example of FIG. 3 only lists one validator, there will generally be multiple validators for most networks. For instance, FIG. 2 lists the additional discovery validator of SnmpValidator. To add these validators to the framework mechanism, the consumer would call the constructor for each validator and then call addDiscoveryAgent ( ) with a reference to the recently added validator object. In this manner, any number of validators may be added by the consumer to the discovery agent list.

Although the addDiscoveryAgent and addCandidateValidator methods could be performed elsewhere (other than in the constructor that accesses a class that inherits from DiscoveryConfiguration class 210), the consumer is the person who knows how many discovery agents and candidate validator agents are needed. Thus, it is best to have the consumer add the discovery agents and candidate validators to their respective lists.

In methods 6 and 7, the consumer then instantiates the candidate systems list object 225 and the valid system list object 235 by calling their respective constructors. Because SystemList class 220 and 230 are preferably the same class, the same constructor will actually be called to instantiate the two objects. For instance, in the programming language JAVA, a statement "SystemList CandidateSystemList=new SystemList ( )" could be used to instantiate a CandidateSystemList object, while a statement "SystemList ValidSystemList=new SystemList ( )" could be used to instantiate a ValidSystemList object. Those skilled in the art may use any manner to create lists of valid and candidate systems, including, if desired, having different classes for CandidateSystemList and ValidSystemList.

It is important to note at this point that, while the methods shown in FIG. 3 are in a certain order, many of these methods may be performed in a different order. For instance, method 7 may be moved to before where method two is currently shown. FIG. 3 is an example that does not necessary indicate the actual sequence of object interaction for a consumer's implementation of the framework mechanism.

Once the discovery agents and candidate validators have been created and added to their respective lists, and the candidate and valid systems lists have been created, the consumer's application 127 calls the discoverSystems ( ) method on the discovery configuration object. This occurs in method call number 8. The discoverSystems ( ) method iterates through the discovery agents in the discovery agent list (not shown in FIG. 3). For instance, in method 9 of FIG. 3, the discoverSystems ( ) method calls the discover ( ) method of the IP discovery agent object.

As stated previously, the discover ( ) method of the discovery agent is where the consumer extends the system discovery framework mechanism by adding a mechanism to discover computers in the network. Generally, this mechanism is related to communications protocols, but it could be any mechanism for discovery of computers in a network. The discover ( ) method preferably discovers a list of computer systems and returns this list to the discoverSystems ( ) method. This list could be any list known to those skilled in the art for indicating discovered computer systems. In general, the list will be similar to SystemLists 220 and 230. The discoverSystems ( ) method compares each system on the returned list of systems with each system in candidate systems list object 225. If a system in the returned list of systems is not in candidate systems list object 225, then the system is added to the candidate systems list object in method 10. Conversely, if a system in the returned list of systems is already in candidate systems list object 225, then the system is preferably not added to the candidate systems list object. This preferred union of discovered systems prevents adding the same system twice to the candidate system list, if the system is discovered by more than one discovery agent or discovered twice by the same discovery agent.

In FIG. 3, method 10 adds a SystemList of discovered systems to candidate systems list object 225. Thus, the discoverSystems ( ) method removes systems from the SystemList of discovered systems returned by the discovery agent if the system is already added to the candidate systems list object 225. Then, the discoverSystems ( ) method adds the entire SystemList at one time to the candidate systems list object by using the addSystems ( ) method. Alternatively, the discoverSystems ( ) method could add systems singly to the candidate systems list object by using the addSystems ( ) method for each system.

In addition, each discover ( ) method of each discovery agent could be made to compare systems that it discovers with systems in candidate systems list object 225. If any newly discovered systems already exist in the candidate system list, the discover ( ) method would not add them to its own list of discovered systems. In this case, the discover ( ) method would then return a list of discovered systems that are not yet added to candidate systems list object 225. Additionally, the discover ( ) methods of each discovery agent could call the addSystems ( ) method on the candidate systems list object 225 to add systems to the candidate systems list. Note that if the discover ( ) method would add systems to candidate systems list object 225, the discover ( ) method, in FIG. 2, should have a "using" relationship from DiscoveryAgent class 250 to SystemList 220 for candidate systems list object 225. FIG. 2 should then be modified to accommodate this change.

It is preferred, however, that the discover ( ) method of each discovery agent simply discover systems in the network and return the systems that it discovers. The discoverSystems ( ) method would create the union of discovered systems by adding those systems that are not currently in the candidate system list to the candidate system list. By having the discoverSystems ( ) method perform these functions, the discover ( ) methods do not need to perform these functions. This makes the design of the discover ( ) methods simpler for the consumer.

The discoverSystems ( ) method iterates through each discovery agent, adding systems to the candidate systems list as each discovery agent returns systems. In the example of FIG. 3, only one call to the discover ( ) method and one call to addSystems ( ) method are shown. In FIG. 2, two more discovery agents were shown, SNANetwork and Ldap discovery agents. If FIG. 3 were to correspond to FIG. 2, then the discoverSystems ( ) method of the discovery configuration object would run the discover ( ) method of both the SNANetwork and Ldap discovery agents. Any discovered systems, returned by these discovery agents, that are not already in candidate systems list object 225 will be added to the candidate systems list by calling the addSystems ( ) method on the candidate systems list object 225.

In step 11, the consumer causes application 127 to call the validateSystems ( ) method on the discovery configuration object. The validateSystems ( ) method iterates through each candidate validator object in the candidate validator list (not shown in FIG. 3). The validateSystems ( ) method preferably calls the candidate validators in the sequence that the consumer added the candidate validators to the candidate validator list. In this manner, the consumer may place the best and most efficient validators first in the candidate validator list. For instance, if the SNMP validator, shown in FIG. 2, is less likely to validate systems for this network and application 127 than is the FTP validator, the consumer can add FTPValidator 240 to the candidate validator list first. Additionally, the validateSystems ( ) method preferably fetches a candidate system from candidate systems list object 225 and runs each candidate validator on this system. If the first candidate validator runs and validates this system, then subsequent validators are not called by the validateSystems ( ) method. Thus, placing the most efficient or best candidate validator in the candidate validator list is beneficial as most systems should be validated by the first validator and subsequent validators will not run.

In the example of FIG. 3, the validateSystems ( ) method calls the isValid ( ) method on the FTP validator object in step 12. The isValid ( ) method in this example receives a system (System 1) from the validateSystems ( ) method. The consumer has implemented the isValid ( ) method to create a mechanism in this method that validates candidate systems for use with the particular application or criteria assigned by the application. As previously discussed, the criteria could be a response time under a certain limit, a certain release of an operating system or program, a capacity (storage space) remaining above a certain limit, having an FTP server, etc. The consumer is responsible for creating the isValid ( ) method to determine the validity of candidate systems.

If the isValid ( ) method of one validator does not a validate a system (this is indicated by having the isValid method preferably return a boolean of FALSE), then the validateSystems ( ) method would run another validator in the candidate validator list until the system is validated or until all validators in the list have been called. If all validators in the list have been called and the system is not validated, the system is not added to valid systems list object 235. This condition does not necessary mean that the system is not valid for use with application 127. Instead, it simply means that the validators did not validate the system. If one of the validators validates the system (preferably by returning a boolean of TRUE), none of the subsequent validators are run and the validateSystems ( ) method adds the system to the valid systems list object 225 by calling the addsystems ( ) method on the valid systems list object 225. This is shown in method 13, where the validateSystems ( ) object calls the addSystems ( ) method, passing the system to be added (System 1) to the addSystems ( ) method. The addSystems ( ) method adds this system as an entry into the valid systems list object 235.

Thus in FIG. 3, the validateSystems ( ) method will select one candidate system and preferably call each validator object for this candidate system (step 12) until a candidate validator validates the system or all candidate validators are called. If one validator object validates a system, the rest of the candidate validators are not called and the candidate system is added to the valid systems list (step 13). The validateSystems ( ) method selects another candidate system, iterates through validators to validate the system (step 12), and adds the system if it is validated to the valid systems list (step 13). This process continues until all candidate systems are examined and are or are not validated.

If desired, each validator object could be passed the list of candidate objects and could return a list of validated objects. The validateSystems ( ) method in this embodiment would create a union of the returned validated systems as valid systems list object 235. Additionally, each isValid ( ) method could be made to call the addSystems method of the valid systems list object 235 and to make a union of validated systems in valid systems list object 235. Note that this would entail, in FIG. 2, a relationship between CandidateValidator 240 and SystemList 230 through ValidSystemList object 235.

However, it is preferred that validateSystems ( ) method operate on one candidate system at a time until all candidate systems have been examined. Again, this makes the construction of the isValid ( ) method easier for the consumer, and it allows the consumer to place the validators in the candidate validator list in the preferred order of execution. In addition, in some cases, the validateSystems ( ) method may not need to be executed if all of the discovered systems are valid for the application. In this instance, the consumer of the systems discovery framework mechanism would create application 127 so that it does not call method 11, validateSystems ( ).

As the examples above illustrate, the systems discovery framework mechanism provides an extremely flexible and powerful tool for discovering and validating systems in a network by simply defining classes that implement the features specific to a particular network and/or application. A framework consumer may extend the framework mechanism in a number of different ways to implement a desired discovery and validating mechanism. For example, many discovery agents may be specified. Or, only one discovery agent may be specified, along with a multitude of candidate validators. Of course, many numerous examples of extensions may be conceived, and the above is given to simply illustrate the great power and flexibility provided by systems discovery framework mechanism 200.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. Note that the term "framework consumer" as used in the specification and the claims denotes any human programmer or any software program that is capable of extending the framework mechanism to define a particular system discovery environment.

What is claimed is:

1. An apparatus coupled to a network for discovery of computer systems in the network, the apparatus comprising:
    at least one processor;
    a memory coupled to the at least one processor; and
    an object-oriented framework mechanism residing in the memory, the framework mechanism comprising a discovery configuration object and at least one discovery agent object, the discovery configuration object directing the at least one discovery agent object to discover computer systems in the network, and the discovery agent object discovers computer systems in the network.

2. The apparatus of claim 1 wherein the framework mechanism comprises a discovery configuration class, the discovery configuration class defining:
    at least a portion of the discovery configuration object; and
    a discover systems method, defined in the portion of the discovery configuration object, that directs the discovery agent object to discover computer systems in the network.

3. The apparatus of claim 2 wherein the discovery configuration class is a core class of the framework mechanism, the implementation of which cannot be modified by a user.

4. The apparatus of claim 2 wherein the at least one discovery agent is a plurality of discovery agents, and wherein the discovery configuration class further defines an add discovery agent object method, defined in the portion of the discovery configuration object, that adds each discovery agent to a discovery agent list, the discover systems method iterating through the discovery agent list and directing each discovery agent in the discovery agent list to discover computer systems in the network.

5. The apparatus of claim 1, wherein:
    the framework mechanism comprises an extensible discovery agent class, the discovery agent class defining:
        at least a portion of the at least one discovery agent object; and
        an extensible discover object method whose existence is defined in the portion of the at least one discovery agent object, the discover object method extended by a consumer to discover computer systems in the network; and
    the discovery configuration object directs the at least one discovery agent to discover computer systems in the network by calling the discover object method on the at least one discovery agent.

6. The apparatus of claim 2 wherein the framework mechanism further comprises at least one candidate validator object that validates computer systems in the network for use with an application, the discovery configuration object directing the at least one validator object to validate computer systems in the network.

7. The apparatus of claim 6, wherein:
the framework mechanism comprises an extensible candidate validator class, the candidate validator class defining:
at least a portion of the at least one candidate validator object; and
an extensible isValid object method whose existence is defined in the portion of the at least one candidate validator object, the isValid object method extended by a consumer to validate computers systems in the network for use with an application; and
the discovery configuration object directs the at least one candidate validator to validate computer systems in the network by calling the isValid object method on the at least one candidate validator.

8. The apparatus of claim 6 wherein the at least one candidate validator is a plurality of candidate validators, and wherein the discovery configuration class further defines an add candidate validator object method, defined in the portion of the discovery configuration object, that adds each candidate validator to a candidate validator list, the discover systems method iterating through the candidate validator list and directing each candidate validator in the candidate validator list to validate computer systems in the network.

9. The apparatus of claim 1, wherein:
the framework mechanism comprises a candidate systems list object instantiated from a system list class having an add systems object method that adds candidate system objects to the candidate systems list object; and
candidate system objects corresponding to candidate computer systems discovered by the at least one discovery agent are added to the candidate system list object.

10. The apparatus of claim 1, wherein:
the framework mechanism comprises a valid systems list object instantiated from a system list class having an add systems object method that adds valid system objects to the valid systems list object; and
valid system objects corresponding to valid computer systems discovered by the at least one candidate validator are added to the valid system list object.

11. A method for discovery of computer systems in a network that is performed on an apparatus coupled to the network and comprising at least one processor coupled to a memory, the method comprising the steps of:
providing an object-oriented framework mechanism residing in the memory, the framework mechanism comprising a discovery configuration object and at least one discovery agent object;
the discovery configuration object directing the at least one discovery agent object to discover computer systems in the network; and
the discovery agent object discovering computer systems in the network.

12. The method of claim 11, wherein:
the framework mechanism comprises a discovery configuration class, the discovery configuration class defining:
at least a portion of the discovery configuration object; and
a discover systems method, defined in the portion of the discovery configuration object; and
the step of the discovery configuration object directing the at least one discovery agent object to discover computer systems in the network comprises the discover systems method directing the discovery agent object to discover computer systems in the network.

13. The method of claim 12 wherein the discovery configuration class is a core class of the framework mechanism, the implementation of which cannot be modified by a user.

14. The method of claim 12 wherein the at least one discovery agent is a plurality of discovery agents, and wherein the discovery configuration class further defines an add discovery agent object method, defined in the portion of the discovery configuration object, and wherein the method further comprises the steps of:
the discovery configuration calling the add discovery agent object method that adds each discovery agent to a discovery agent list; and
the discovery configuration calling the discover systems method, which iterates through the discovery agent list and directs each discovery agent in the discovery agent list to discover computer systems in the network.

15. The method of claim 11, wherein:
the framework mechanism comprises an extensible discovery agent class, the discovery agent class defining:
at least a portion of the at least one discovery agent object; and
an extensible discover object method whose existence is defined in the portion of the at least one discovery agent object, the discover object method extended by a consumer to discover computer systems in the network; and
the method further comprises the step of the discovery configuration object directing the at least one discovery agent to discover computer systems in the network by calling the discover object method on the at least one discovery agent.

16. The method of claim 11 wherein the framework mechanism further comprises at least one candidate validator object, and wherein the method further comprises the steps of:
the discovery configuration object directing the at least one validator object to validate computer systems in the network; and
the at least one candidate validator object validating computer systems in the network for use with an application.

17. The method of claim 16, wherein:
the framework mechanism comprises an extensible candidate validator class, the candidate validator class defining:
at least a portion of the at least one candidate validator object; and
an extensible isValid object method whose existence is defined in the portion of the at least one candidate validator object, the isValid object method extended by a consumer to validate computers systems in the network for use with an application; and
the method further comprises the step of the discovery configuration object directing the at least one candidate validator to validate computer systems in the network by calling the isValid object method on the at least one candidate validator.

18. The method of claim 16 wherein the at least one candidate validator is a plurality of candidate validators, and wherein the discovery configuration class further defines an add candidate validator object method, defined in the portion of the discovery configuration object, and wherein the method further comprises the steps of:

the discovery configuration object calling the add candidate validator object method that adds each candidate validator to a candidate validator list:
the validate systems method iterating through the candidate validator list and directing each candidate validator in the candidate validator list to validate computer systems in the network.

19. The method of claim 11, wherein:
the framework mechanism comprises a candidate systems list object instantiated from a system list class having an add systems object method that adds candidate system objects to the candidate systems list object; and
the method further comprises the step of the add systems object method adding candidate system objects, corresponding to candidate computer systems discovered by the at least one discovery agent, to the candidate system list.

20. The method of claim 11, wherein:
the framework mechanism comprises a valid systems list object instantiated from a system list class having an add systems object method that adds valid system objects to the valid systems list object; and
the method further comprises the step of the add systems object method adding valid system objects, corresponding to valid computer systems discovered by the at least one candidate validator, to the valid system list object.

21. A program product for discovery of computer systems in a network, the program product comprising:
an object-oriented framework mechanism providing a discovery configuration object and at least one discovery agent object, the discovery configuration object directing the at least one discovery agent object to discover computer systems in the network, and the discovery agent object discovers computer systems in the network; and
signal bearing media bearing the framework mechanism.

22. The program product of claim 21 wherein the signal bearing media comprises recordable media.

23. The program product of claim 21 wherein the signal bearing media comprises transmission media.

24. The program product of claim 21 wherein the framework mechanism comprises a discovery configuration class, the discovery configuration class defining:
at least a portion of the discovery configuration object; and
a discover systems method, defined in the portion of the discovery configuration object, that directs the discovery agent object to discover computer systems in the network.

25. The program product of claim 24 wherein the discovery configuration class is a core class of the framework mechanism, the implementation of which cannot be modified by a user.

26. The program product of claim 24 wherein the at least one discovery agent is a plurality of discovery agents, and wherein the discovery configuration class further defines an add discovery agent object method, defined in the portion of the discovery configuration object, that adds each discovery agent to a discovery agent list, the discover systems method iterating through the discovery agent list and directing each discovery agent in the discovery agent list to discover computer systems in the network.

27. The program product of claim 21, wherein:
the framework mechanism comprises an extensible discovery agent class, the discovery agent class defining:
at least a portion of the at least one discovery agent object; and
an extensible discover object method whose existence is defined in the portion of the at least one discovery agent object, the discover object method extended by a consumer to discover computer systems in the network; and
the discovery configuration object directs the at least one discovery agent to discover computer systems in the network by calling the discover object method on the at least one discovery agent.

28. The program product of claim 24 wherein the framework mechanism further comprises at least one candidate validator object that validates computer systems in the network for use with an application, the discovery configuration object directing the at least one validator object to validate computer systems in the network.

29. The program product of claim 28, wherein:
the framework mechanism comprises an extensible candidate validator class, the candidate validator class defining:
at least a portion of the at least one candidate validator object; and
an extensible isValid object method whose existence is defined in the portion of the at least one candidate validator object, the isValid object method extended by a consumer to validate computers systems in the network for use with an application; and
the discovery configuration object directs the at least one candidate validator to validate computer systems in the network by calling the isValid object method on the at least one candidate validator.

30. The program product of claim 28 wherein the at least one candidate validator is a plurality of candidate validators, and wherein the discovery configuration class further defines an add candidate validator object method, defined in the portion of the discovery configuration object, that adds each candidate validator to a candidate validator list, the discover systems method iterating through the candidate validator list and directing each candidate validator in the candidate validator list to validate computer systems in the network.

31. The program product of claim 21, wherein:
the framework mechanism comprises a candidate systems list object instantiated from a system list class having an add systems object method that adds candidate system objects to the candidate systems list object; and
candidate system objects corresponding to candidate computer systems discovered by the at least one discovery agent are added to the candidate system list object.

32. The program product of claim 21, wherein:
the framework mechanism comprises a valid systems list object instantiated from a system list class having an add systems object method that adds valid system objects to the valid systems list object; and
valid system objects corresponding to valid computer systems discovered by the at least one candidate validator are added to the valid system list object.

33. An object-oriented framework mechanism for use in an apparatus that supports an object oriented programming environment and for discovering computer systems in a network, the framework mechanism comprising:
a discovery configuration object that directs the at least one discovery agent object to discover computer systems in the network; and
the at least one discovery agent object that discovers computer systems in the network.

34. The object-oriented framework mechanism of claim 33 wherein the framework mechanism comprises a discovery configuration class, the discovery configuration class defining:

at least a portion of the discovery configuration object; and a discover systems method, defined in the portion of the discovery configuration object, that directs the discovery agent object to discover computer systems in the network.

35. The object-oriented framework mechanism of claim 34 wherein the discovery configuration class is a core class of the framework mechanism, the implementation of which cannot be modified by a user.

36. The object-oriented framework mechanism of claim 34 wherein the at least one discovery agent is a plurality of discovery agents, and wherein the discovery configuration class further defines an add discovery agent object method, defined in the portion of the discovery configuration object, that adds each discovery agent to a discovery agent list, the discover systems method iterating through the discovery agent list and directing each discovery agent in the discovery agent list to discover computer systems in the network.

37. The object-oriented framework mechanism of claim 33, wherein:

the framework mechanism comprises an extensible discovery agent class, the discovery agent class defining:
at least a portion of the at least one discovery agent object; and
an extensible discover object method whose existence is defined in the portion of the at least one discovery agent object, the discover object method extended by a consumer to discover computer systems in the network; and the discovery configuration object directs the at least one discovery agent to discover computer systems in the network by calling the discover object method on the at least one discovery agent.

38. The object-oriented framework mechanism of claim 34 wherein the framework mechanism further comprises at least one candidate validator object that validates computer systems in the network for use with an application, the discovery configuration object directing the at least one validator object to validate computer systems in the network.

39. The object-oriented framework mechanism of claim 38, wherein:

the framework mechanism comprises an extensible candidate validator class, the candidate validator class defining:
at least a portion of the at least one candidate validator object; and
an extensible isValid object method whose existence is defined in the portion of the at least one candidate validator object, the isValid object method extended by a consumer to validate computers systems in the network for use with an application; and the discovery configuration object directs the at least one candidate validator to validate computer systems in the network by calling the isValid object method on the at least one candidate validator.

40. The object-oriented framework mechanism of claim 38 wherein the at least one candidate validator is a plurality of candidate validators, and wherein the discovery configuration class further defines an add candidate validator object method, defined in the portion of the discovery configuration object, that adds each candidate validator to a candidate validator list, the discover systems method iterating through the candidate validator list and directing each candidate validator in the candidate validator list to validate computer systems in the network.

41. The object-oriented framework mechanism of claim 33, wherein:

the framework mechanism comprises a candidate systems list object instantiated from a system list class having an add systems object method that adds candidate system objects to the candidate systems list object; and candidate system objects corresponding to candidate computer systems discovered by the at least one discovery agent are added to the candidate system list object.

42. The object-oriented framework mechanism of claim 33, wherein:

the framework mechanism comprises a valid systems list object instantiated from a system list class having an add systems object method that adds valid system objects to the valid systems list object; and valid system objects corresponding to valid computer systems discovered by the at least one candidate validator are added to the valid system list object.

* * * * *